United States Patent [19]

Daniels et al.

[11] 4,160,906
[45] Jul. 10, 1979

[54] ANATOMICALLY COORDINATED USER DOMINATED PROGRAMMER FOR DIAGNOSTIC X-RAY APPARATUS

[75] Inventors: Herbert E. Daniels, Brown Deer; Paul M. Stivender, Waukesha; Paul C. Schanen, Wauwatosa; Robert V. King, Waukesha, all of Wis.

[73] Assignee: General Electric Company, Schenectady, N.Y.

[21] Appl. No.: 809,218

[22] Filed: Jun. 23, 1977

[51] Int. Cl.$^2$ ............................ A61B 6/00; H05G 1/46
[52] U.S. Cl. .................................. 250/322; 250/402; 250/415; 250/416 R; 364/414
[58] Field of Search ................ 250/413, 415, 416 R, 250/322, 401, 402; 364/414, 415

[56] References Cited

U.S. PATENT DOCUMENTS

| | | | |
|---|---|---|---|
| 3,916,192 | 10/1975 | Schmitmann | 250/322 |
| 3,932,759 | 1/1976 | Brundlin | 250/416 |
| 3,999,044 | 12/1976 | Grim | 250/401 |

FOREIGN PATENT DOCUMENTS 2404469  7/1975  Fed. Rep. of Germany ........... 250/415

OTHER PUBLICATIONS

Jurgen, Ronald K., "Software (and hardware) for the 'medics'", *IEEE Spectrum*, Apr. 1976, pp. 40–43.

*Primary Examiner*—Alfred E. Smith
*Assistant Examiner*—T. N. Grigsby
*Attorney, Agent, or Firm*—Ralph G. Hohenfeldt

[57] ABSTRACT

A control console has a small and compact array of twenty-seven illuminable push buttons arranged in three continuous groups of nine each. The buttons in the upper group relate to anatomical areas in upper parts of the body, and the buttons in the lower group relate to areas in the lower parts of the body and the extremities. The middle group are control and x-ray technic variation buttons. Different anatomical regions are indicated by pictographs on the push buttons in an organized array in the upper and lower groups. Pressing at least one push button in the middle group and one in the other groups sets up and displays the x-ray exposure parameters corresponding with the equivalent of the user's priority technic, including safe patient exposure and safe x-ray tube operating time, which has been stored in a memory, for the particular anatomical region. The programmed values for tube kV, mA, mAs and time are displayed. Controls are provided for enabling the user to dominate the programmed settings by overriding the stored values when professional judgement indicates. The principal stored technic data values may be altered easily when and if experience with stored values shows need for override within the normal range of patients of one or more of the principal technic parameters to accommodate an abnormal patient or medical condition.

14 Claims, 5 Drawing Figures

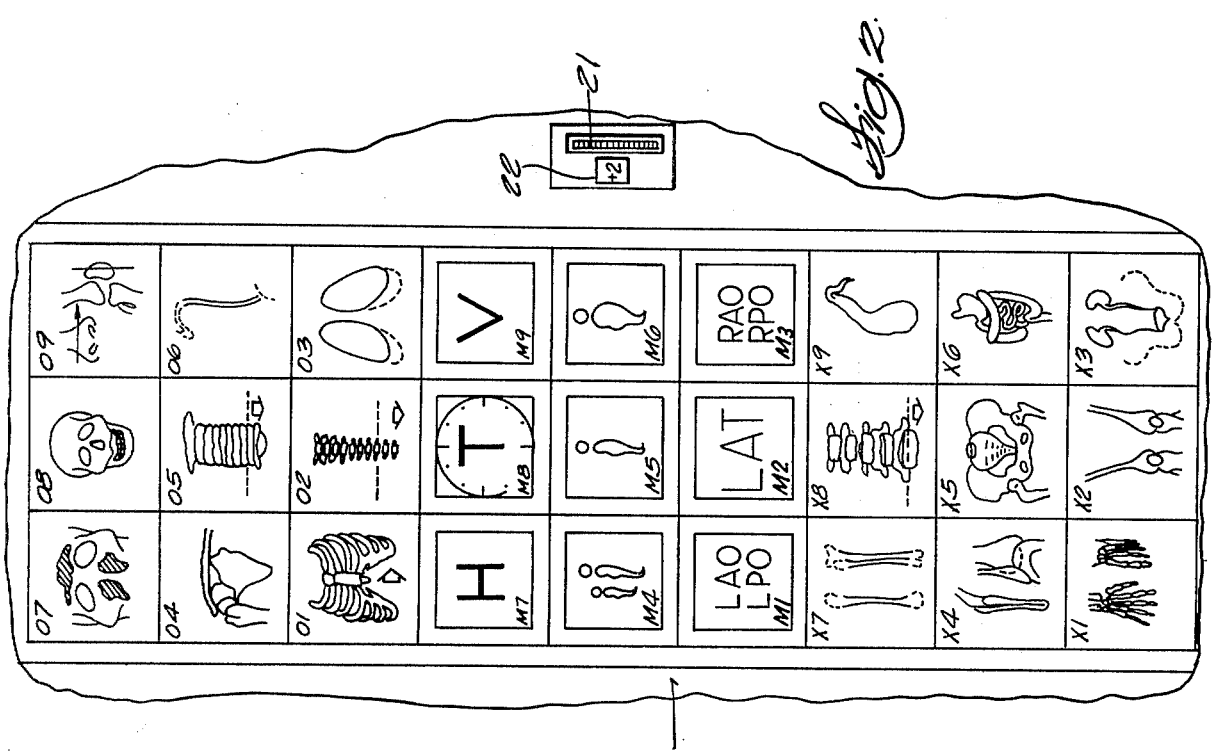
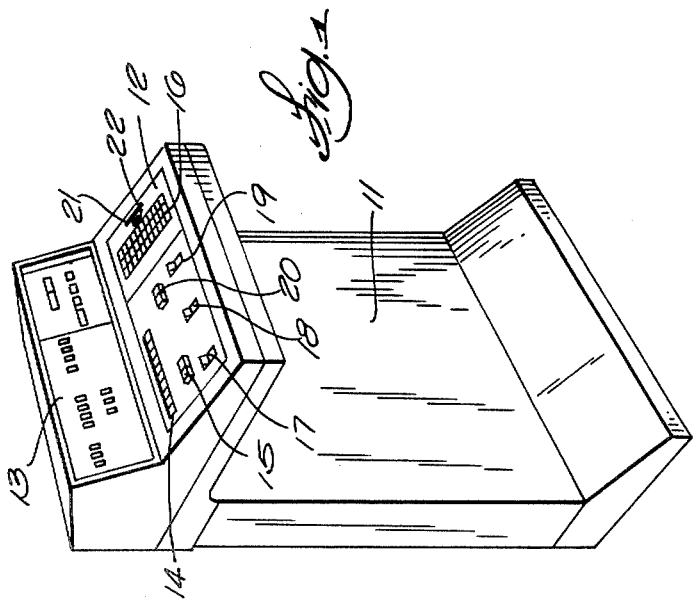
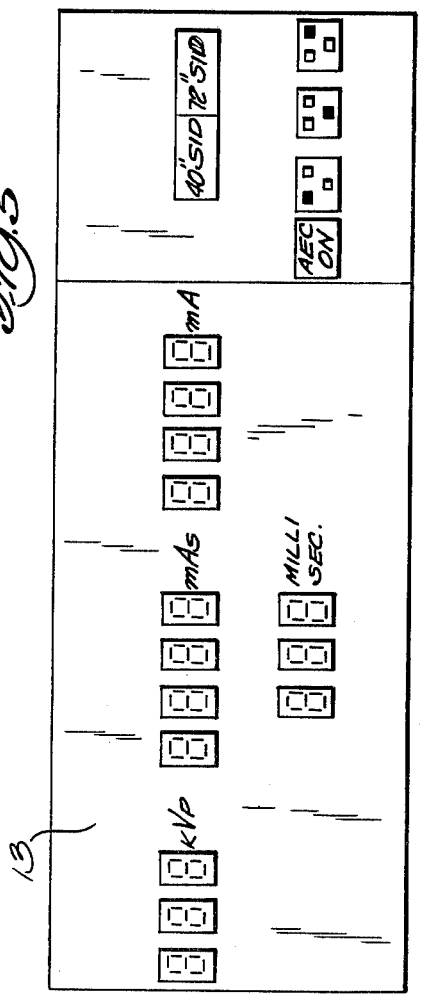

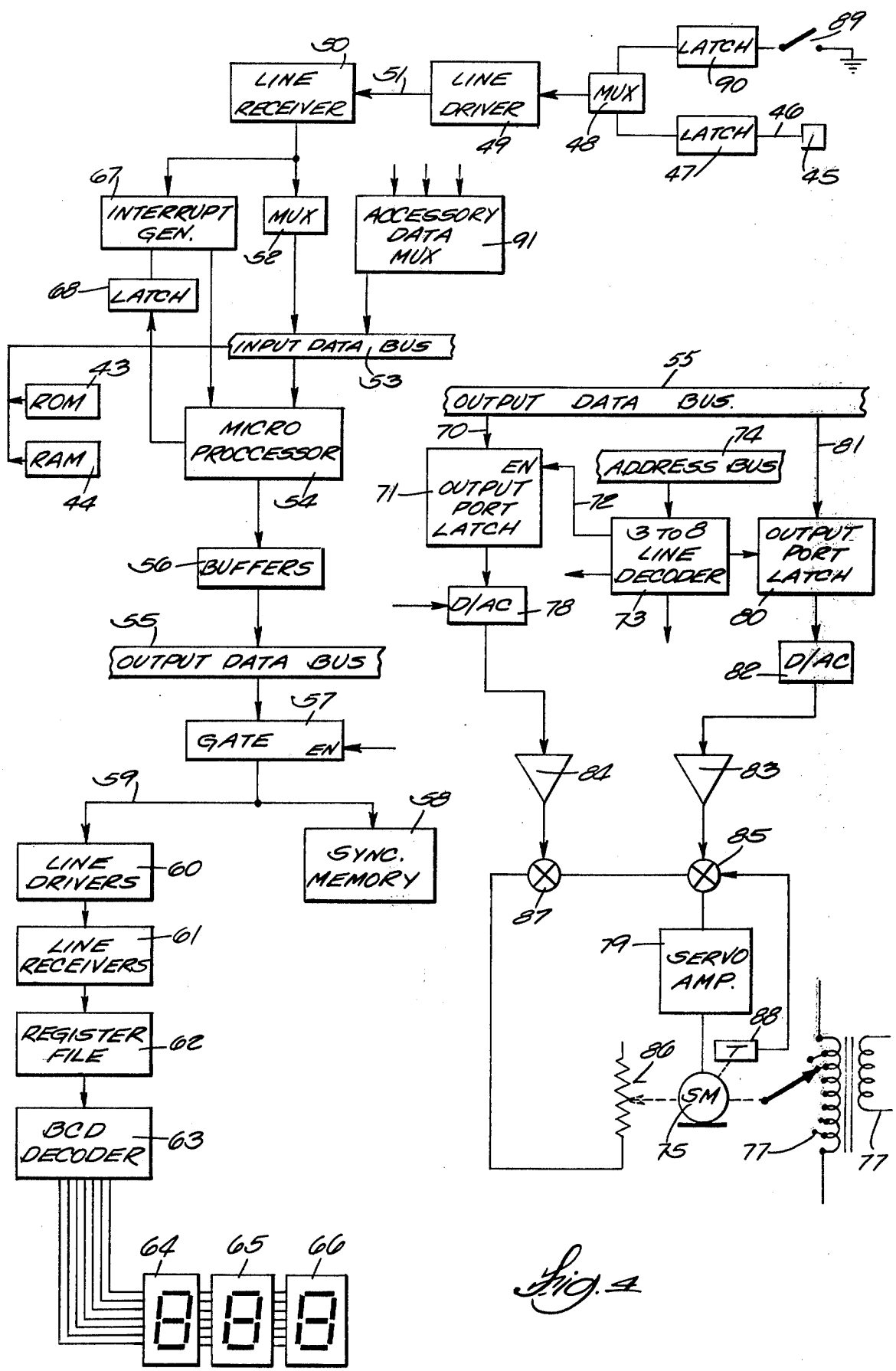

ANATOMICALLY COORDINATED USER DOMINATED PROGRAMMER FOR DIAGNOSTIC X-RAY APPARATUS

This application is related to a co-pending application Ser. No. 810,343, having the same title and filing date as this application.

BACKGROUND OF THE INVENTION

This invention relates to diagnostic x-ray apparatus. In particular, the invention pertains to programmed automatic selection of the parameters for conducting various diagnostic technics, where the data pertaining to routine x-ray technics is stored in a memory for recall and execution of control functions in response to the x-ray technologist, hereafter called the user, is accomplished by simply pressing one or a few push buttons. The values of all pertinent parameters are displayed instantaneously when a technic is selected. The invention further features anatomically coordinated user dominated programming whereby the user may resort to operation of a switch, or a few switches at most, to override the programmed parameters and introduce selected discretionary parameters of his own choice without the need to switch off the programmer entirely.

Most radiology departments follow what they consider to be consensus or standard operating procedures for various types of x-ray diagnostic examinations. For instance, for routine examination of the lungs of a series of patients in a particular radiological department and for the sake of uniformity in reading radiographs, all users would select the same x-ray tube factors such as the milliamperes (mA), anode kilovoltage (kV) and milliampere-seconds product (mAs) where the chosen tube factors would depend somewhat on the thickness of the patient. The same type of x-ray intensifying screen, the same filament and focal spot size in the x-ray tube, the same source or focal spot to film distance and possibly other parameters would also ordinarily be chosen in accordance with practices that are standardized for the particular radiology department. The parameters for various technics are often stored in the minds of the users, but they are sometimes recorded on technic charts to which reference may be made as required. If, for example, the pelvis of a thin patient were to be the subject of an examination and an anterior-posterior view were to be made, the exposure parameters could be elicited from the technic chart in order to obtain procedural standardization.

Traditionally, x-ray apparatus users were obliged to make a judgement as to the proper settings of the kV, mA, mAs, focal spot size, type of intensifying screen and so forth that is appropriate for the individual and part of the anatomy of the individual which is to be radiographed.

In accordance with the traditional methods discussed above, the user normally sets x-ray exposure parameters which, in the judgement of the user, are appropriate for that part of the anatomy which is to be examined. Usually several knobs must be turned and switches must be actuated before everything is set to produce the radiographic film density which the user desires and expects. When making the settings, the user considers all factors that might affect the exposure such as the size and thickness of the patient, the best x-ray tube focal spot size, the type of intensifying screen being used, the focal spot to film distance, and whether the direction of the x-ray beam is anterior-posterior, lateral or oblique. When an automatic exposure control (AEC) is used, the proper ion chamber or photosensor must be selected to have it fall within the x-ray field at a place that is representative of the density of the anatomy in the field central to the diagnostic area of interest. The user must also consider whether the kV, mA and mAs parameters for a technic are set to impose a safe thermal load on the x-ray tube. If the kV and mA are set too high in order to shorten the exposure interval, the instantaneous thermal ratings of the x-ray tube may be exceeded and x-ray tube life will be shortened. Attempts have been made to minimize the above identified problems by providing x-ray control systems wherein exposure parameters could be made a function of the part of the anatomy which is to be examined. The basic optimum objective was to allow the user to operate several push buttons or switches to call forth a predetermined x-ray technic. Prior anatomically based x-ray technic selectors did not achieve their intended purpose and had several problems. Firstly, too few technics were made available to cover the whole body or infrequently used procedures. Secondly, no means were provided to easily override one or more of the stored technic factors while maintaining other stored parameters or factors unchanged. When any factor other than kV had to be changed, the entire anatomical selector had to be turned off and then most factors had to be re-entered at another location. Allowing discretionary values is important in that it allows a user to follow his judgement when the condition of the patient or a medical requirement does not allow a traditional set of factors for a successful radiograph. Also, some patients are uncooperative and require specialized high speed technics to stop motion. These alternative technics were not usually available in existing purported anatomical programmers due to their limited number of stored technic programs.

Additional disadvantages of prior anatomical programmers are that their control panels lacked easy correlation of anatomical area and the control function to be selected. This situation often cancels out much of the expected convenience of an anatomically based technic selector. These was also an absence in most prior systems of the ability to program fixed time technics as well as AEC technics so a patient with a condition not appropriate for AEC, such as scoliosis, collapsed lung and the like, could not be radiographed using programmed values.

Another important deficiency in known anatomical programmers is that they are adapted for use with "decreasing kilowattage (kW)" or "falling load" x-ray tube control systems for non-tomographic procedures. In falling load systems, the kV on the tube is held constant during an exposure. In theory, the exposure begins at the full rated maximum load current on the tube. This load then begins to fall off from the initial peak during the exposure to avoid thermal overloading of the x-ray tube target. This is done by causing the tube current to decline during an exposure and by extending the duration or time of the exposure. It will be evident that the total kilowattage applied to the tube will be the integral of the product of the constant kV and the area under the declining tube current curve. Falling load generators are, however, routinely installed with de-rated initial loads of 85% of the rated tube kW or lower. So, using a constant kV, the exposure time must be extended even more than is theoretically dictated.

Moreover, the majority of x-ray technics do not require that the tube kV and mA be set at their maximums to obtain the shortest exposure time or mAs product. Thus, if unduly high mA is regularly used, reduced x-ray tube life can be expected. As is the case in most prior attempts at anatomical programming, programmers which do not provide manual control for mA may be presumed to provide a high or maximum tube current, thus compromising x-ray tube life.

A prior attempt at anatomical programming is disclosed in U.S. Pat. No. 3,916,192. It displays an outline of the human body divided into seven general zones extending from the head to the feet. A manual rotary selector switch is operated to select one of the general zones in which the anatomy of x-ray interest exists, and this first selection sets up the programmer preliminarily for determining the parameters for the technic. If the lungs were of interest, for example, the chest region is selected and visually indicated. But the chest region has bone such as the arms and spine as well as soft tissue organs. So still another selection must be made among seven more push button switches to set up the programmer for the particular technic. Thus, the maximum number of programmed technics available is 7×7 or 49. This patent refers to selecting and displaying radioscopic data such as kV and mA. This is not the same as selecting and displaying data for radiography as is achieved in the present invention. Radioscopy is an archaic term which has been supplanted by the term "fluoroscopy", and its use could be misleading in a discussion wherein the main topic is a programmer for producing radiographic films. No means are evident for the user to dominate or modify a single parameter such as x-ray tube current or voltage or exposure time within a particular programmed technic. Rather the user must switch off the programmer and then enter the required technic data manually. In this prior attempt, no means are provided for manually setting x-ray tube mA. Only manual kV and mAs controls are provided. Also, this prior attempt at programming technics does not provide for display of essential programmed technic parameters or data which are programmed for kV, mAs, mA and exposure time or safety time limits. Thus, a user who must adjust for an unusual patient condition must recall all of the data or refer to a published technic chart. Futhermore, the user must enter all of this data.

Other known prior patents in the realm of x-ray technic programming are U.S. Pat. Nos. 3,902,069, 3,932,759 and 3,969,625.

SUMMARY OF THE INVENTION

In accordance with the invention, a new user dominated anatomical x-ray programmer is provided. It is characterized by storing data representative of all of the factors and parameters related to a wide variety of x-ray technics. The various parts of the anatomy, which are considered discrete areas of radiography, are represented by pictographs on a cluster of push buttons. When the user decides on the technic that is to be used, two or three push buttons may be pressed to bring about automatic selection and display of tube kV, mAs, mA, time, focal spot size, automatic exposure control or fixed timer if appropriate, backup mAs, proper ion chamber or photosensing areas, proper x-ray source-image distance (SID), and compensation for patient size, all dependent on the particular body area of interest. Each of these parameters are determined at the option of the user for each anatomical area, analogous to a technic chart, and are programmed in at the time the x-ray apparatus is installed. In addition, means are provided for deviating from customized quickly accessed technics at any time simply by operating one or more raise-lower slewing switches which cause the anatomically programmed values to be overridden. In any case, the significant parameters such as the kV, mA, mAs, exposure time and maximum mA are displayed before an exposure is effected. The discretionary or free choice procedure allows the user to choose technic factors which, in his judgement, ought to be selected for unusual situations. On the other hand, the automatic anatomical programmmer will ordinarily cover 90 or more percent of the technics which are routinely encountered in the radiology department without need for further operator intervention.

A general object of the invention is to provide a user dominated anatomical programmer which will permit quick and automatic selection of x-ray exposure parameters for the vast majority of technics and properly display the parameters so as to obviate the need for the user to modify any parameter in view of the value of other parameters which may have been chosen.

A further object is to enable selection of the proper technic for any anatomical area with minimum deliberation on the part of the user whereby to facilitate obtaining x-ray views of uniform high quality rapidly.

A further object is to achieve with the programmer the capability of always operating under "constant load" conditions wherein kV and mA are held constant during an exposure as opposed to the "falling load" method wherein mA is variable during an exposure. A correlative of this object is to enable the user to operate the x-ray tube at its full rated capacity for any exposure without the danger of overloading the tube inadvertently. An incident of this is that the user can take advantage of the high and full rating of the tube for which he may have paid a premium, and the user can be assured that the life of the tube will be maximized since those technics or routinely handled patients will in the majority of cases be satisfied with a programmed conservative x-ray tube loading.

Another object of the new anatomical programmer is to assure that the basic or customized technic parameters which have been programmed will always be given priority or become the first choice of parameters for each technic.

Still another object achieved with the user dominated anatomical programmer is to provide for making special settings or modifications of the exposure parameters and retaining these parameters even though the x-ray apparatus is turned off after the last exposure. Thus, if the user is not satisfied with the quality of the last radiograph made following its quick development, the user can go back and turn the machine on and the previously set special parameters will be displayed so that they can be modified quickly in the proper direction for making another exposure.

A further object is to provide for obtaining variant technics and high speed technics, which are modifications of the parameters for customized technics, by simply pushing a button as required. Thus, high speed technics are easily accessed for those instances when the patient's physical or mental condition does not result in total cooperation that is required for arresting motion, for instance, during an exposure. Variant technics are readily accessed for recumbent chest radiographs, for instance, which are not routine but are used when the patient is too ill to stand erect for examination such as is required when a regular chest x-ray unit is used.

Another object is to provide an anatomical programmer wherein regions or areas of the anatomy are depicted on individual push buttons which, if pressed in preparation for making an exposure, will ordinarily set the parameters for making an anterior-posterior or posterior-anterior (frontal) exposure, but where other types of exposures, such as lateral, left and right anterior oblique and left and right posterior oblique exposure factors, may be set by simply pressing an additional push button. A correlative of this is that there is automatic cancellation of any manually entered modifications of programmed technics and the programmer returns to its normal frontal format when a second or subsequent anatomical part identifying push button is pressed. Thus, except for patient size, all technic parameters or data selected and displayed initially is consistent with the pictograph of the push button.

How the foregoing and other more specific objects of the invention are achieved will appear in the course of the ensuing more detailed description of an illustrative embodiment of the invention taken in conjunction with the drawings.

DESCRIPTION OF THE DRAWINGS

FIG. 1 is a perspective view of a control console for the user dominated programmed x-ray technic selector;

FIG. 2 is a plan view of an array of push buttons which are used for x-ray technic selection;

FIG. 4 is a circuit diagram, mostly in block form, for illustrating typical operational features of the programmer; and FIG. 5 is an enlargement of the display panel which is shown in the control console depicted in FIG. 1.

DESCRIPTION OF A PREFERRED EMBODIMENT

Figure 3:
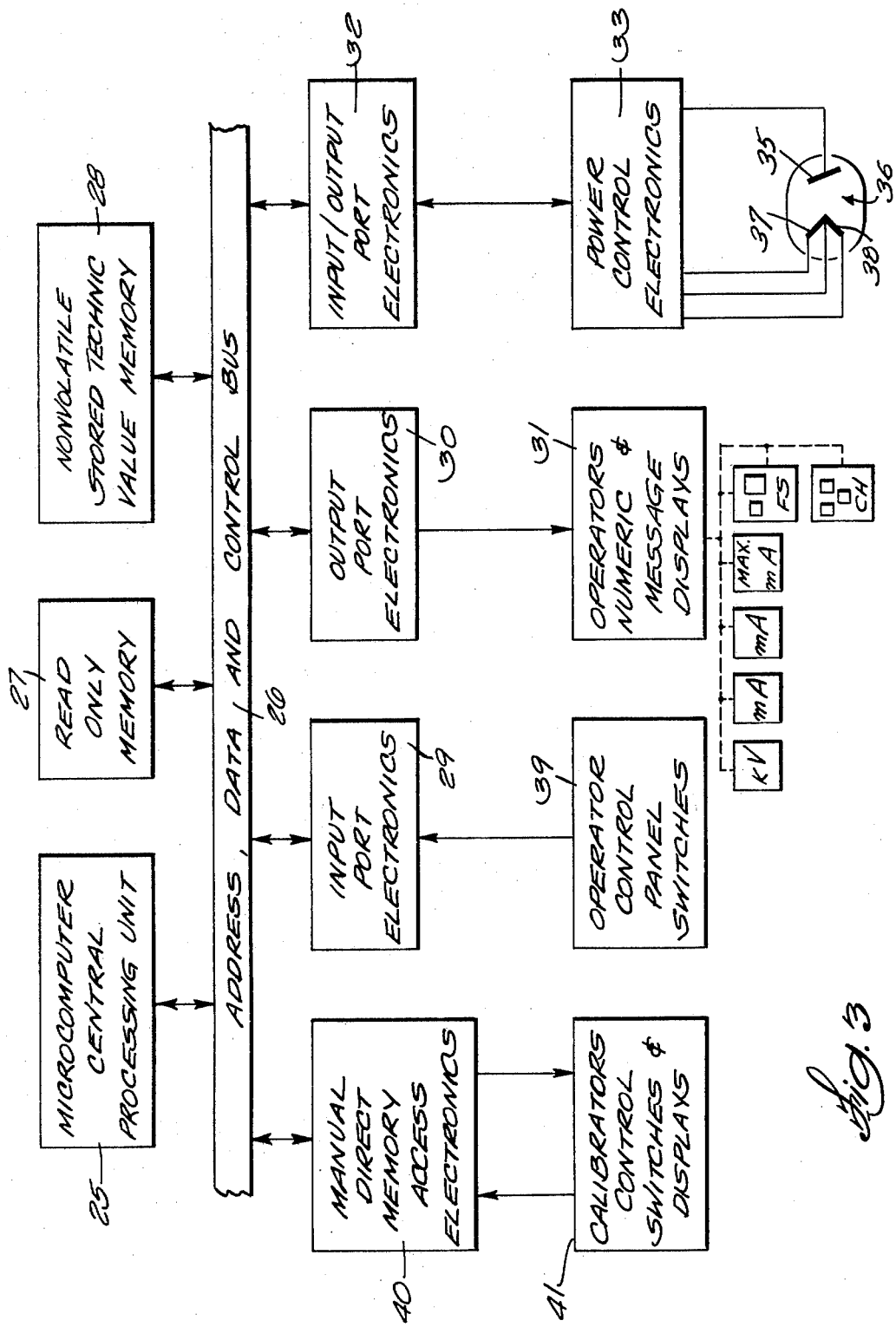
FIG. 3 is a block diagram of the anatomical programmer.

FIG. 1 shows the control console for the user dominated anatomical programmer. This console would ordinarily be located in proximity with a diagnostic x-ray table or other x-ray examining apparatus, not shown. The console is generally designated by the reference numeral 10. It comprises a floor mounted stand 11, an operator's switch and push button panel 12 and a data display panel 13. Various parameters related to selected x-ray exposures are displayed on panel 13 such as kV, mA, mAs, time, and the receptor field or fields of the AEC radiation detector such as the ionization chambers which are or are not in use. The manner in which displays are brought about will be discussed later.

The operator's push button and switch panel 12 has a row of push button switches 14 which includes on-off push buttons and a number of other push buttons which perform various functions such as the selection of accessory devices for certain radiographic procedures. There are other illuminated push buttons, such as the pair marked 15, which serve as a reset if there is a tube overload and another in the pair which blinks if AEC exceeds its limit. Illuminated push buttons in an array 16, which has twenty-seven push buttons, are arranged in rows of these and columns of nine. Push button array 16 is involved prominently in the anatomical programmer features of the invention as will be explained. Push button switches marked 20 control selection of large and small focal spot sizes of the x-ray tube, and are used to display the programmed focal spot when technics are selected by way of array 16.

Panel 12 also has a rocker or slewing switch 17 which is actuated to select unprogrammed values of x-ray tube kV. Another similar switch 18 is for manual setting of mAs, and another switch 19 is for manual setting of mA. When these three switches are used, the functions dictated by the push button switches in the array 16 are overridden temporarily.

An enlargement of push button array 16 is shown in FIG. 2. Various technic programs are activated by operating these push buttons. There are a total of twenty-seven push buttons each of which has light source behind it, not visible in this figure, for indicating when it is active. The indicator circuitry will be discussed later. The push buttons in FIG. 2 are arranged in three groups, each of which has nine push buttons. The upper group is numbered O1 to O9 to make reference convenient. Each push button in the upper group has the pictograph of an anatomical area printed on it. The anatomical regions in the upper group refer generally to the upper part of the body. The lower group of nine push buttons are marked X1 to X9. These have pictographs which relate to anatomical areas which refer generally to the lower half of the body. The middle group of nine push buttons are control and technic variation buttons. Besides having the letters and pictographs which can be observed in FIG. 2, the push buttons in the middle group are marked M1 to M9 for identification. To the right of the array of buttons is a thumbwheel switch 31 by which the user may change the film exposure density in connection with AEC technics as will be explained. A window 22 in the panel displays a number which is indicative of the amount by which the radiographic film density using automatic exposure control timing is raised or lowered above a programmed setting.

The push buttons in FIG. 2 which have pictographs of anatomical areas are arranged in columns and rows. In general, the left-hand column is for commanding x-ray technics progressing from the head region of the body toward the distal end of the extremities. The middle column has spinal and midline technics, and the right-hand column refers to organs and soft tissue areas. Selection of the parameters related to the push buttons is indicated by those buttons being illuminated.

As mentioned briefly above, the parameters for a large number of x-ray technics are represented by digital data which is stored in memory as will be discussed later. The parameters for a particular technic are all set automatically in response to two or up to a few of the push buttons being pressed. The programming is such that if any push button in the upper group of O1 to O9 or in the lower group of X1 to X9 are pressed, the programmer will formulate the exposure parameters for exposing, the illustrated, usually frontal x-ray view after a patient size has been selected by pressing push button M4, M5 or M6. That is, a frontal view will be taken wherein the x-ray beam is projected from the source or focal spot at the front of the patient, through the patient and to the rear where the film or other x-ray sensing device is located. Frontal views have first priority since they are most easily recognized and are, therefore, used for the pictographs. Exceptions to this are the lateral nose and superior patella technics which are depicted on push buttons O9 in FIG. 2.

A discussion in reference to FIG. 2 of how various technics are commanded by operation of push buttons in array 16 will facilitate understanding of the operating mode and other structural features of the anatomical programmer.

Assume that the technician desires to make a radiographic film of the cervical spine of a heavy or fat patient. Assume that a posterior or frontal view is desired. This kind of view is selected on a priority basis automatically. The first thing the user would do is press one of the buttons in the row M4–M6 on which thin lightweight, medium weight and heavy bodies are depicted. If the patient were heavy, M6 would be pressed and its indicator lamp would turn on while at the same time energizing the control unit. Since the cervical spine is the subject of examination, button O5 would also be pressed. The parameters for such an exposure would immediately be set up without any additional thought or action on the part of the user. In this case a 40 inch SID would be indicated. The x-ray exposure can be made immediately by operating the customary hand switch, not shown, to initiate the exposure.

If the user had accidentally pressed push button O2, for example, relating to the spine, when the cervical spine was actually desired, the error can be corrected simply by pressing the O5 button for the cervical spine, and this would erase or deactivate button O2.

When any of the anatomical area buttons in the upper and lower groups are pressed, the x-ray exposure parameters for an anterior-posterior view, otherwise known as a frontal view, are all selected automatically in accordance with the program and are all properly related to each other. The anatomical area buttons in array 16 define the following parameters: (1) AEC on or off; (2) ion chamber field area to be used; (3) x-ray tube focal spot size; (4) kV; (5) mAs; (6) mA; and (7) x-ray source-to-image distance (SID) which is the recommended distance and is used to compute the other parameters which were just stated. The program dictates use of AEC for the vast majority of technics that are selectable with the push button array 16. Use of AEC has priority except in those cases where it is inappropriate. Typically, the program prohibits use of AEC when very small areas of the anatomy are being radiographed such as the distal extremities, nose, patella and tangential beam technics where an AEC sensor cannot be covered completely by the body part. Phototiming or AEC is also not used when radiography is performed using an x-ray beam which will not fall on an AEC sensor. Examples of this are the transverse beam radiographs taken decubitus or the gall bladder or lateral hip. In those cases, the user selects a fixed time technic using push button M8 which extinguishes the "AEC on" display on display panel 13.

Assume further that in connection with the cervical spine radiography example discussed above, the user decides that instead of the priority frontal view, a lateral view is also desired. In such case it is only necessary to press the push button M2 in the control group marked LAT. The stored program then provides a new set of exposure parameters such as kV, mA, back up mAs, as well as display of the appropriate 72 inch SID. Due to the size of the lateral cervical spine there is no need to change the AEC ion chamber field selection, as would be the case in changing from the frontal view of lung fields to a lateral or oblique view, for example.

Continuing with the example of a particular technic, if the user desires a lateral anterior oblique view or a right posterior oblique view of the cervical spine, push button M1 in the middle control group of nine would be pressed. To obtain a right anterior oblique view or a right posterior oblique view, which is equivalent, push button M3 would be pressed. Of course, if M1 or M2 had been in a pressed state with their indicator lamps on when M3 was pressed, the one of M1 or M2 which was pressed would be deactivated and the exposure parameters would be controlled exclusively by the data in memory that is appropriate for a right anterior oblique view of a heavy patient. The technic parameters stored for oblique views are the same as for lateral except for the ionization chamber field selection which is altered to eliminate the effect of the spine as is appropriate when doing oblique views of the lungs, abdomen, and so forth.

Also in the middle group is a button M7 showing a large H. H stands for high speed technics and may be used in conjunction with any of the previously mentioned buttons, to create a technic with higher speed, that is, with shorter exposure time, than the normal selection. When this button is pressed, there is an automatic increasing of x-ray tube mA, kV or both. The H button and the technics which it initiates is used, for example, to radiograph moving anatomy or tremorous patients where stopping motion by means of a short exposure time is required. Where no higher speed technics are appropriate, such as for radiography of the patella or nose, the H button is used to select unique technics for other body parts such as the mandible in this example. Another button M9 in the middle group shows a large V. V stands for variant technics except that the technic may be varied, as dictated by the program, from the normal technic in any manner which may yield faster or slower exposure times. If an anatomical area button is pressed, pressing the V button will bring about a stored modification for the parameters that normally result from selecting the particular anatomical area button. Examples of variant technics are the non-screen exposure values for extremities and the technics for the recumbent patient lung fields at 40 inch SID.

Another button in the middle group of control function buttons has the legend T on it and a representation of the dial of a clock. This button is also given the reference numeral M8. T stands for fixed time technics. Depressing this button changes the technic from an AEC mode to a fixed time mode. Depressing the fixed time button also in many cases can cause the compensation mode for thin or heavy patients to change. In other words, where kV must be altered for thin or heavy patients when using AEC to prevent wide variations in exposure time and the possibility of exposures too short for the AEC subsystem exists, in the use of the fixed exposure timer, the compensation needs to be only in the mAs since time is a known and programmed technic parameter. Seven different sets of kV or mAs increments and decrements for thin and heavy patients are available to the technician who is programming the device.

From the discussion thus far, it should be evident that a large number of predetermined technics are programmed for the eighteen anatomical areas represented by the pictographs on the push buttons. There is stored data for the exposure parameters for the normal, usually frontal, exposure mode as shown on the pictographs of the two upper and lower nine-button groups in array 16. Thus, considering that there are eighteen anatomical regions and a different set of data for parameters depending on the weight of the patient, 3×18 or 54 separate technics are immediately perceived. Each of these can be further modified by selecting a lateral or oblique technic by pressing one of the three buttons M1–M3 to provide two times more technic modifications without counting the few alterations of ionization chamber fields for oblique views, thus bringing the sum to this point up to 2×54 or 54 or 108 technics. In addition, there are 108 unique technics available when the H button is depressed, and still another 108 unique technics available when the V button is depressed. In a commercial embodiment, a total of 324 distinctive technics and associated exposure parameters can be recalled by simply pressing two or up to four of the push buttons in the array 16. The majority of the 324 technics will be executed using AEC on a priority basis. Pressing the T button converts any of these technics to a fixed time technic and adds to the technic count accordingly. The arrangement of the push buttons in FIG. 2 was briefly alluded to earlier. More specifically, bony structures are covered by the buttons in the left-most column. Button O7 relates to the mastoid and sinus area in the head. Button O4 relates to the shoulder and clavicle area. Button O1 relates to the ribs, X7 to the humerus and leg bones, X4 to the forearm, elbow and ankle and X1 to the extremities including the hands, wrists and feet.

In the center column, push button O8 relates to the skull; O5 to the cervical spine and odontoid; O2 to the thoracic spine; X8 to the lumber spine; X5 relates to the pelvis area; and, X2 relates to the femur and knee. The push buttons in the center column cover the bony center line of the patient.

In the third column, push button O9 relates to the nose, patella, mandible and zygoma areas; O6 relates to the esophagus; O3 relates to the lungs and soft tissue in the chest; X9 relates to the gall bladder; X6 relates to the digestive tract including the stomach and colon as visualized using barium sulphate contrast media; and, X3 relates to the urinary tract, abdomen, kidneys, ureters and bladder as visualized using iodine based contrast medium.

In a commercial embodiment, values of mA, kV and focal spot size are stored together with values of exposure time limits for AEC, which are the lesser of either about six times the expected time, to thereby protect the patient from excess radiation or establish the electrical limiting time that is necessary to protect the x-ray tube against thermal overload.

The system also features the capability of permitting the user to make judgmental or discretionary free choices of exposure parameters independent of those which have been programmed. This is termed the user dominated approach because it permits the user to dominate or override customized parameters which are stored. To bring this function into effect, the user will press one of the push buttons relating to the anatomical area of interest so that the normal exposure parameters will be recalled from memory to govern the exposure of that area. However, since modification of at least one of the parameters is assumed to be desired, the user will actuate one of the kV, mAs or mA slewing switches 17–19, respectively, to raise or lower one or all of the kV, mAs or mA factors as desired. The exposure may then be made by actuating the hand switch in a conventional manner. Unlike prior anatomical programmers wherein only two or three loads (kW), one for the large focus of the x-ray tube, another for the small focus and occasionally one or more low values of mA for tomography, in the commercial embodiment of this invention, provision is made for selection of eight values of constant mA for the large focus and sixteen values of constant mA for the small focus. The maximum values of X-ray tube load (kW) are programmed values held in the memory of the control. Whenever the user dominates either of the programmed values of kV or mAs or both so as to select a value which would, when integrated with the programmed value of mA, cause an x-ray tube overload, then the programmed value of mA is decremented automatically in small steps of approximately 20% as appropriate to protect the x-ray tube from overload. Moreover, as the mA is decremented a new value of exposure time is determined and displayed by calculating the quotient of the altered value of mAs divided by the decremented value of mA. As implied earlier, another feature of the controller is that when a special technic is set as discussed in the preceding paragraph, the controller may be turned off without loss of the settings. Thus, the settings will continue to exist and their values will be displayed when the apparatus is turned on again so that the settings may be used as a point of departure for further modification. The settings will change when a new anatomical area designating push button in one of the upper and lower groups of nine in the push button array 16 is pressed.

A block diagram overview of the electrical system for effectuating the above described functions is shown in FIG. 3. This system is based on the use of a microcomputer central processing unit 25. The microcomputer is coupled with a bus 26 which is labeled the address, data and control bus. The bus consists of a set of common signal lines over which the subsystems of the computer communicate with each other. Coupled with bus 26 is a read-only memory (ROM) 27. This memory is used to store the control algorithms or routines that the central processing unit (CPU) 25 will execute. Memory 27 need not be of the ROM type. It can be a random-access memory (RAM) if it is maintained non-volatile with a battery power supply. Fixed system constants are also stored in the ROM 27.

A second memory section is represented by the block 28 which is a non-volatile memory, that is, it experiences no data loss when power is turned off. This is achieved by using a battery power supply, not shown. Memory 28 is a read-mostly memory. It is used to store the system calibration and other unique control parameters. It is also used to store the anatomical selector technic values in coded form.

Input port and output port electronics are represented, respectively, by the blocks 29 and 30. The input port electronics 29 encompasses other subsystems, such as digital multiplexers, to place input data on the data bus at such time as is specified by the central processing unit 25. The input port electronics may also include other signal pre-processing electronics such as analog-to-digital (A/D) converters. The input port electronics 29 interfaces between the operator controls and the central processor and, ultimately, the x-ray tube power. The output port electronics 30 includes digital registers or latches to store information as dictated by the central processing unit 25 and may include other electronics such as digital-to-analog converters (D/ACs). The output port interfaces bus 26 with numeric and message displays that are exhibited on display panel 13 of the console 10. Port 30 also interfaces the central processing unit, ultimately, with the x-ray tube controls. The operator's numeric and message displays are symbolized by the block 31. Displayed information is further specified in adjacent blocks most of which are self evident. The block FS exhibits whether the large or small x-ray tube focal spot is in use during a technic. The block CH exhibits the ion chamber or chambers which are in use for any technic that uses phototiming or AEC.

The input and output port electronics are in block 32. This port, by way of bus system 26, permits the central processing unit 25 to communicate in both directions with the control electronics 33 for x-ray tube 34. The control electronics block 33 includes the devices for controlling the x-ray tube power during an exposure such as the high voltage transformer for applying the kV to the tube and the means for setting the kV in response to parameter data accessed by the central processor for a technic. Also included is a reactor for setting tube filament current in response to data. The block further embraces timing circuits and the ion chambers which sense the x-ray field intensity for AEC.

The x-ray tube has an anode 35 and a cathode 36 represented as comprising two filaments 37 and 38 which can be energized independently to produce electron beam focal spots on anode 35 of different sizes. The focusing means for the cathode beams are not shown, but will be understood to be present.

The operator control panel switches are symbolized by the block 39. This block represents the technic selector switches in the array 16, the rocker or slewing switches 17-19 for selecting kV, mAs and mA manually and other switches on the control panel 12 of console 10.

Another block 40 is designated the manual direct memory access electronics. This is the electronics for introducing data related to technics and other matters to the stored technic value memory 28. This permits storing the equivalent of a customized technic chart as was discussed earlier. Another block 41 is designated the calibrator's control switches and displays. The components of block 41 are not ordinarily accessible to the user, but are used by the electronics technician for accessing the memories and displays and for introducing or modifying the stored data.

Now to be discussed in reference to FIG. 4 are some electronic circuits which typify how functions and technics heretofore discussed are achieved. In the upper right of FIG. 4, one of the technic selector push button switches from the array 16 is selected and is marked 45. The push button switch contacts are coupled with four parallel lines represented by the cable 46 to latch 47. The 4-bit line continues to a multiplexer (MUX) 48. Time division multiplexing is used. The digital words dictated by switch 45 and latched in latch 47 are multiplexed in one of the 128 time slots which are used in the actual embodiment. The state, that is, the on or off state of switch 45, like the states of the other user actuable slewing and selector switches, are repeatedly scanned as dictated by the central processor which responds by accessing data for parameters such as mA, kV, mAs, back up or limiting mAs, focal spot size, AEC in or out and others for programmed as well as discretionary user dominated technics. This data ultimately controls the x-ray tube current, voltage and conduction time, the three basic factors for any technic. Typically, the scan or byte or word rate is 10 kHz. If push button switch 45 were not depressed, latch 47 would be storing a 4-bit digital word consisting of all zeros. When switch 45 is depressed, a unique data word consisting of digits other than all zeros is produced. MUX 48 is operated synchronously or strobed at a regular rate so that it will transmit the selected digital word in its time slot.

The data words from MUX 48 are passed through a line driver 49 which shapes the high and low signals constituting the digital word and raises their level for transmission to a line receiver 50 by means of four parallel lines 51. The line receiver 50 converts the digital signals to integrated circuit logic compatible levels. The strobing and clock signal inputs, and other inputs which are conventionally applied to multiplexers, are not shown in relation to MUX 48, but they will be understood by those skilled in the art. It should also be understood that MUX 48 provides an address for the data in each of the time slots, respectively.

The data outputted by line receiver 50 is processed by another synchronous device or multiplexer MUX 52. It couples the data to input data bus 53, a fragment of which is shown. Where the data goes from there depends on interpretation of its address by microprocessor 54 that is part of the central processing unit 25 which was mentioned in connection with FIG. 3. In an actual embodiment, a type 8080 microprocessor is used. It is, of course, operated on a repeating time cycle as is well known. The timing of the microprocessor is such that it first looks at the data on the input bus 53 and on its next time cycle it looks at the address of the data so as to determine the significance of the data. When the microprocessor receives data and an address, it addresses a ROM 43 to procure the instructions programmed for the x-ray technic that is called forth by pressing push buttons associated with a particular part and patient size. The data from the ROM instructs the microprocessor 54 to select the data for the technic from the random-access memory or RAM 44 in which this data is stored.

The RAM contains a set of control parameters such as kV, mA, mAs, focal spot size and others associated with the anatomical area. The RAM also contains information to specify the degree of change of kV or mAs for patient size in accordance with the selected anatomical area. The modification modality kV or mAs associated with patient size is also programmed in the RAM and is made a part of the technic parameter modification as deemed appropriate to the body part being radiographed and as appropriate to the method of exposure time control, that is, whether the method is fixed time or AEC. Generally, the mAs is incremented or decremented for patient size and for bony structure and the kV is incremented or decremented for organs and for those larger bony structures when AEC is the exposure control method.

The microprocessor then outputs the data to the output data bus, one fragment of which is marked 55. There are conventional buffers 56 interposed in the lines between microprocessor 54 and output data bus 55. Of course, at this time, a large number of data words are being supplied to output data bus 55 for driving multiple devices.

What has just been described is representative of what happens when one of the technic selector push buttons, 01 to 09 and X1 to X9, related to an anatomical area is actuated. The data on the output bus is used in two ways, one of which is to control devices which in turn control the parameters for an x-ray exposure. The other is to control display of certain parameters. The matter of displaying data will be discussed first.

Consider that the data on output bus 55 may be an ecoded representation of the x-ray tube kV, mA, mAs and, possible exposure time, and any other special data related to a particular technic.

For the purposes of displaying data, the digital data signals are gated, by means of a synchronously enabled gate 57, to a synchronous (sync) memory 58. The sync memory stores display information for all of the controls in the system. For example, it stores numeric data for kV, mA, mAs and time and data for any other information that is to be displayed, such as the indicators for which AEC sensors are in use and the indicators for focal spot size. The sync memory 58 is analogous to a rotating drum memory controlled by a free-running counter to access 128 8-bit words in 128 clock periods. Sync memory 58 outputs synchronously to a display data bus 59. As the unique data occurs in respective time slots, it is transmitted from data display bus 59 through line drivers 60 to line receivers 61. The signals are then received in a register file 62 which is essentially a latch that stores incoming digital signals until a value change occurs. The register file outputs binary coded decimal digital words which are decoded in a decoder 63. The decoder outputs are for driving, in this case, 7-segment display devices 64, 65 and 66. The display devices are representative of devices used for displaying mA, mAs, kV and time. There is an individual set of devices for each of these parameters.

The factors or parameters which are displayed instantaneously, with the user selecting any programmed or user dominated discretionary technic, are readily apparent in FIG. 5 which is an enlargement of the control console display panel 13. At the left of the panel there are three 7-segment light emitting display devices adjacent the legend kVp. This is where the kV value, which is to be applied to the x-ray tube during the exposure, is displayed. The legend kVp is used on the panel to indicate tube voltage instead of kV, as used herein for brevity, because kVp designates peak voltage which is the actual voltage as opposed to kV which could be interpreted to mean root mean square or average voltage. Maximum x-ray penetrating power depends on peak voltage.

Panel 13 in FIG. 5 also has four 7-segment display devices for mAs as indicated by the adjacent legend, mAs. Similarly, there are three digit displays for the exposure time associated with any chosen technic, marked "milli Sec.", and four digit displays for x-ray tube current designated by the legend mA.

In the right area of panel 13 in FIG. 5, the x-ray tube or source focal spot to image distances (SID), which are determined parameters for technics, are displayed. There are 40 inch and 72 inch SIDs, and these numbers and letters are on transparencies behind which a lamp lights in accordance with the SID which applies. Whether AEC is on is indicated by an indicator lamp being on behind a legend given this information as shown. There are also indicator lamps behind the three groups of triangularly arranged markers which correspond with the way the x-ray sensing ion chambers are arranged in the x-ray beam path for AEC purposes. The clear squares indicate which ion chambers are active for a technic by having an indicator lamp go on behind the appropriate group.

Now that the display circuitry and devices have been discussed, the discussion of how the data mentioned earlier on output bus 55 is used to control a parameter such as the kV applied to the x-ray tube for a particular technic will be resumed. Another segment of output data bus 55 is shown in the upper right region of FIG. 4. For the sake of illustration, setting of the kV parameter will be described. Control and use data for many other parameters is analogous. Assume that the data pertaining to the kV parameter appears on output data bus 55 in its time slot. For voltage control, the data is fed from the data bus with eight parallel lines that are represented by the single line 70. These lines lead to the input of an output port latch 71. This latch has a port-write (PWR) strobe line 72 associated with it. This is a different strobe than the one used for storing data in sync memory 58. It requires a line decoder 73 which, in this case, is a 3-to-8 line decoder for decoding a portion of the address on address bus 74, and also the control signals to govern at which point in time a strobe is to be generated to store the data which is on the output bus 55. The addresses are, of course, appearing sequentially on address bus 74 as controlled by microprocessor 54. At the appropriate time, data representative of the desired kV parameter will be inputted to output port latch 71 and stored therein. In the particular case of kV, the data word from output latch 71 is a binary word that is proportional to the operator requested or automatically dictated programmed value of kV. A 7-bit word is used to cover 128 voltage steps. Actually there is an offset of 25 kV, which is the minimum that will ever be applied to the x-ray tube in this example, so the 128 voltage steps are actually increments between 25 kV and 150 kV which is the maximum kV. The object of the circuitry is to drive a servo motor 75, in the lower right of FIG. 4, which sets the taps on an autotransformer primary coil 76. The primary coil is magnetically coupled to a secondary high voltage or stepped up voltage coil 77 of the transformer. The customary full-wave rectifier, which intervenes between the x-ray tube and the output terminals of transformer secondary 77, is not shown because it is conventional and known to those who are involved in x-ray tube power systems.

The voltage indicative data stored in output port latch 71 is supplied to a digital-to-analog converter (D/AC) 78. The analog output signals from D/AC 78 are used ultimately to drive a d-c servo amplifier 79 which controls servo motor 75.

The system takes into account the fact that there will be regulation of the voltage from high voltage transformer output 77 in an amount depending on the current loading of the x-ray tube for a particular technic. The desired tube current or mA is, of course, controlled by data stored in the RAM 44 for any particular technic. To compensate the high voltage to avoid voltage regulation for whatever value of tube current is associated with the particular technic, a correction has to be made in the servo motor position. Accordingly, the compensating signal is provided in addition to the absolute value of the kV chosen. This is accomplished by using another output port latch 80 which is coupled to eight parallel lines 81 to output data bus 55. One of the data words that appears on bus 55 is the amount of compensation that is required for the automatically selected kV and mA values assigned to the chosen technic. This data is strobed into output port latch 80 under the control of decoder 73. This digital data is further delivered from output port latch 80 to a D/AC 82 where the signals are converted to analog signals. The analog signals are supplied to the input of an analog receiver 83 or operational amplifier. The analog signals, representative of the absolute value of kV chosen and supplied by D/AC 78, are supplied to the input for another analog receiver 84. The output signals from receivers 83 and 84 are combined or summed in a summing device 85. Thus, it is the composite of the two analog signals that is supplied to the d-c servo amplifier 79 to effect setting of the input voltage to the transformer by means of tap changing servo motor 75. In this manner, the kV is maintained at a constant value independent of the mA chosen. By way of example, if a technic determined manually or automatically called for a tube current of 150 mA, there would be a unique value stored in voltage compensation output port latch 80, and if some other values such as 300 mA were the desired tube current, a different compensating value would be stored in this latch. It may be noted that latch 80 is strobed at a different time than output port latch 71 to sample data on the output data bus 55, but since both data values are latched, summing takes place during coexistence of the corresponding analog signals in summer 85. Everytime either an mA change is made or a kV change is made, both latches 71 and 80 are updated with the appropriate values. Hence, there is always a predetermined and constant voltage applied to the x-ray tube during the entire exposure interval associated with a technic.

The servo drive system for the voltage control is essentially conventional. It has the usual position potentiometer 86 whose signal is fed into a summing amplifier 87 to effect null of the servo motor. A tachometer 88 also produces a signal proportional to motor velocity which is summed with the voltage setting signals in summing amplifier 85.

In the upper right region of FIG. 4, one pair of contacts 89, of one of the slewing rocker switches such as 17 in the control console for setting kV manually, is shown. Signals from this switch contact 89 are also coupled to a latch 90, and are read out in the proper time slot with a MUX such as 48. Assuming that the contacts 89 are in an active state when the rocker switch is pressed to raise x-ray tube kV, a particular data word will be delivered over the same path to the input data bus 53 as were the signals that are originated by actuating a technic selector push button such as 45 to an active state. The microprocessor then puts signals on the output data bus which correspond with increasing voltage values in steps. These signals are strobed into output port latch 71 and represent the basic selected kV as in the case of automatic technic selection. The microprocessor also accesses data and puts it on the output data bus 55 for acceptance by the other output port latch 80 which provides the voltage compensating signals that depend on the mA setting of the x-ray tube as in the above discussed example.

The x-ray tube mA setting circuitry is analogous to the circuitry discussed above in connection with voltage setting. Of course, the current or mA setting circuitry would respond to digital data corresponding with current values on the output data bus 55. The current setting circuit, not shown, has an output port latch similar to the one marked 71 in the voltage circuit, and there is digital-to-analog conversion of the signals. Instead of controlling a servo motor, however, the signals are used to control the current to a control coil of a saturable reactor, not shown, which is connected in the filament current transformer primary circuit, not shown.

These are analogous circuits or channels which are governed by data drawn from memory when a particular technic is set by operation of a technic button, or connecting one or the other of the x-ray tube filaments 37 or 38 to their power supply so as to determine the focal spot size that will be used with a particular technic. The switches for connecting one filament or the other in the circuit are not shown.

After the apparatus is powered up, diagnostic technics may be conducted. The first step in using the programmer is to press one of the patient size indicating push button switches in the group of M4, M5 or M6 which are used to turn the programmer on and off. Pressing the push button once so it is in an active state makes digital data relative to the on state and patient size accessible in the time slot for the data. The microprocessor would effect continuous scanning of the switch state. Normally, the user would then press a programmed technic selector push button switch in the groups of 01–09 and X1–X9 in array 16. The pictographs on these buttons are easily recognizable anatomical areas which are organized in the array to make recognition relative to the body easy. For first priority normal or frontal technics, no other switches need be activated prior to operating the x-ray initiating hand switch.

As indicated earlier, whenever one of the anatomical area push buttons in the array 16 is operated, data for a normal first priority frontal exposure is ultimately provided to output data bus 55 for actuating the kV, and mA, mAs and time setting circuits. There are also channels for selecting the proper ionization chamber in the phototiming or AEC system for the area that is to be radiographed. On the other hand, if one of the other function buttons such as that which dictates a lateral or a lateral anterior or posterior exposure is pressed after an anatomical area technic selector button is pressed, one or the other or all of the kV, mA and mAs values may be changed to obtain the proper exposure. The data for the modified exposures is, of course, stored in random-access memory and is retrievable therefrom and ultimately supplied to the output data bus in any case. The ionization chambers for the AEC system, for course, are selected in accordance with the x-ray field that is to be covered. In any case, only those areas in the x-ray beam will be sensed for phototiming or AEC which are filtered by an intervening body portion. To do otherwise might result in a phototimed interval being governed by integrated x-ray intensity from a part of the beam which does not pass through the body and should not govern phototiming.

The anatomical programmer can be easily overridden if the user desires to set his own parameters for a particular technic. Although it is not shown, there are inputs to MUX 48 which give the status of the respective manually set kV, mAs and mA rocker type slewing switches, 17, 18 and 19, respectively, in the control panel 12 of console 10. Operation of any or all of these switches by the user in connection with inserting discretionary operating parameters results in the technics dictated by the programmer in its normal mode being overridden. When a switch is operated, it is sensed by an interrupt signal generator 67 which enables the microprocessor to suspend program execution and service the interrupt causing event, which in this example, is manual setting of a parameter. A latch 68 informs the outside world as to which function the microprocessor will execute next. The signals indicative of the states of these switches, as implied briefly above, are multiplexed in the usual manner, and supplied to input data bus 53 in FIG. 4 which allows them to be received by microprocessor 54. The microprocessor then looks at the data corresponding with the chosen mA, kV, or mAs and goes through tube protector computations which are based on kV, mA and mAs values stored in memory. The microprocessor determines if the manual settings are within the ratings of the x-ray tube so as to be considered valid for the system. If they are valid, the data goes to sync memory 58 in their appropriate time slots. This enables the selected tube factors to be displayed as was explained earlier. If the combination of factors is not valid, the microprocessor looks for a new mA value that would result in a safe loading of the xy-ray tube. This means that the kV, mA or mAs must be reduced. In practice, the microprocessor would increase the exposure time if it chose a lower and safe value of mA automatically. Increasing the exposure time still permits achieving a calculated mAs for obtaining proper film density, but the longer time would enhance thermal dissipation in the x-ray tube during the exposure. It will be evident that the x-ray tube power ratings are stored in non-volatile RAM 44 for the microprocessor to be able to perform these functions.

As mentioned earlier, a definite value of x-ray tube current and voltage are chosen for each technic that is set either manually or with the technic selector buttons. There is no falling off of the x-ray tube current as there is in a falling load system where the current must be decreased in dependence on the total exposure time lest the x-ray tube be overloaded and suffer thermal damage. The falling load system dictates that an exposure must be made longer to get the same amount of energy out of the x-ray tube.

Having a constant current, as well as a constant kVp for all exposures controlled by the system, permits use of the system for tomography where constant current is a necessity. As seen in FIG. 4, information on tomography and other accessory data may be coupled into the system with an accessory data multiplexer, MUX 91. Again, the necessary data is provided on input data bus 53 and used by the microprocessor to select appropriate and valid values of kV, mA and mAs on a constant load basis.

An important feature of the invention is that for every technic on which data is stored there are also a set of backup technic factors that are compatible with patient safety. Means are provided for de-energizing the x-ray tube if the backup values are reached during any exposure in which AEC is used.

We claim:
1. An anatomically based programmed diagnostic x-ray system for conducting diagnostic technics comprising an x-ray tube and power control means coupled with said x-ray tube for controlling its power,
   central processor means having input and output means and including memory means for storing data corresponding with parameters including the x-ray tube current (mA), x-ray tube kilovoltage (kV), exposure time (S), current-exposure time product (mAs), use and nonuse of automatic exposure control (AEC), x-ray field area sensor means and x-ray tube focal spot size for various x-ray technics and for storing programs to control said processor means,
   automatic exposure control means included in said power control means,
   a plurality of manually operable switch means having active and inactive states including technic selector switch means related, respectively, to anatomical areas composing the entire human body and user dominating switch means operable to select kV, mA and mAs independently at the option of the user,
   said technic selector switch means being operable, respectively, to active states for selecting programs which determine the parameters for a predetermined priority x-ray technic for the anatomical area related to the technic selector switch means which has been operated and in which technics said AEC means is activated,
   means for coupling said switch means to said input means to enable said processor means to scan the states of said switch means, said processor means responding to switch means in active states by executing a program which results in providing output data corresponding with parameters for the selected technic, said x-ray tube power control means being responsive to said output data,
   said technics for anatomical areas, which have such x-ray transmissive properties as to be incompatible with use of AEC, being programmed to determine a fixed exposure time for the selected technic and to deactivate said automatic exposure control means simultaneously.

2. An anatomically based programmed diagnostic x-ray system for conducting diagnostic technics comprising an x-ray tube and power control means coupled with said x-ray tube for controlling its power,
   central processor means having input and output means and including memory means for storing data corresponding with parameters including the x-ray tube current (mA), x-ray tube kilovoltage (kV), exposure time (S), current-exposure time product (mAs), use and nonuse of automatic exposure control (AEC), x-ray field area sensor means and x-ray tube focal spot size for various x-ray technics and for storing programs to control said processor means,
   automatic exposure control means included in said power control means,
   a plurality of manually operable switch means having active and inactive states including technic selector switch means related, respectively, to anatomical areas composing the entire human body and user dominating switch means operable to select kV, mA and mAs independently at the option of the user,
   said technic selector switch means being operable, respectively, to active states for selecting programs which determine the parameters for a predetermined priority x-ray technic for the anatomical area related to the technic selector switch means which has been operated and in which technics said AEC means is activated,
   means for coupling said switch means to said input means to enable said processor means to scan the states of said switch means, said processor means responding to switch means in active states by executing a program which results in providing output data corresponding with parameters for the selected technic, said x-ray tube power control means being responsive to said output data,
   said power control means including means for determining the kilovoltage (kV), current (mA), exposure time (S), and current×time product (mAs) parameters for said x-ray tube for the technic which is to be executed, operation of any of said user dominating switch means being determined by said central processor means as being an active state for said switch means, said central processor means responding by providing output data corresponding to the setting of any of said user dominating switch means for thereby controlling said power control means to determine the modified selected parameter in preference to the priority parameters which would have controlled if only a technic selector switch means for an anatomical area were actuated to an active state.

3. The system as in claim 2 wherein said plurality of manual operable switch means includes a group of body size indicative switch means which relate respectively to small, medium and large x-ray examination subjects,
the states of said body size switch means being scanned for said processor means to respond by providing to said x-ray tube power control means output data representative of x-ray exposure parameters determined by operation of one of said anatomical area selector switch means as modified for the size of the subject.

4. The system as in claim 2 wherein operation of one of said body size indicative switch means and one of said anatomical area related technic selector means results in output data representing the x-ray tube operating priority parameters for a frontal x-ray view.

5. The system as in claim 2 wherein said plurality of manually operable switch means includes a group of x-ray view indicating switch means respectively related to left and right oblique views and lateral views,
the states of said view indicating switch means being scanned in conjunction with scanning the states of said body size and anatomical area selector switch means resulting in output data representing the x-ray tube operating parameters for one of said oblique and lateral views and for said body size.

6. The system as in claim 2 wherein:
said plurality of user dominating switch means are operable respectively to permit discretionary setting of the x-ray tube operating parameters including the current (mA), kilovoltage (kV) and current-×time product (mAs) for said tube for a desired technic,
display means for visually displaying the values of the mA, mAs and kV to be established by said x-ray tube power control means during execution of a technic,
said display means displaying said values in response to output data corresponding with the mA, mAs and kV parameter values for technics determined by operation of said user dominating switch means and by said anatomical area related selector switch means.

7. In a diagnostic x-ray system including an x-ray tube, means for controlling x-ray technic parameters including the kV and mA applied to said tube during an exposure and the exposure time, an x-ray technic programmer for establishing the parameters for technics based on discrete anatomical areas respectively composing an entire human body, comprising:
an array of switch means including members of said array which designate said anatomical areas respectively, including bony structures, organs and extremities,
central processor means having input and output means,
memory means for storing control algorithms for said central processor means, for storing fixed system constants, for storing data comprising control parameters and x-ray technic parameters,
multiplexer means having input means coupled to said respective switch means and having output means coupled with said central processor input means,
said central processor means being responsive to data multiplexed onto said input means upon actuation of one of said anatomical area switch means by accessing predetermined parameter data from said memory means pertaining to the parameters for the technic determined by said actuation,
output register means coupled to said output means for receiving data representative of said parameters,
display means, for displaying at least some of said parameters, driven by said output register means,
a plurality of output port means coupled to said central processor output means,
means responsive to parameter related signals corresponding with data supplied to said output port means by controlling said controlling means for said x-ray technic parameters,
said algorithms control said central processor means to select data for producing a specific parameter for the kV to be used for each technic selected by actuation of said switch means and for producing a parameter for an unvarying value of mA for said technic which will result in constant power being applied to said x-ray tube for the entire duration of any exposure.

8. In a diagnostic x-ray system including an x-ray tube, means for controlling x-ray technic parameters including the kV and mA applied to said tube during an exposure and the exposure time, an x-ray technic programmer for establishing the parameters for technics based on discrete anatomical areas respectively composing an entire human body, comprising:
an array of switch means including members of said array which designate said anatomical areas respectively, including bony structures, organs and extremities,
central processor means having input and output means,
memory means for storing control algorithms for said processor means, for storing fixed system constants, for storing data comprising control parameters and x-ray technic parameters,
multiplexer means having input means coupled to said respective switch means and having output means coupled with said processor input means,
said processor means being responsive to data multiplexed onto said input means upon actuation of one of said anatomical area switch means by accessing predetermined parameter data from said memory means pertaining to the parameters for the technic determined by said actuation,
a plurality of output port means coupled to said central processor output means,
means responsive to parameter related signals corresponding with data supplied to said output port means by controlling said controlling means for said x-ray technic parameters,
said plurality of switch means including slewing switch means operable by the user to dominate by altering or overriding the programmed technic parameters of kV, mA and mAs incrementally, said slewing switch means being operable to states which are determined by said central processor means and cause said means to process said signals in lieu of signals received as a result of operation of said anatomical area related technic selector switch means, said programs determining those instances where said altered values of one or both of kV and mAs would result in the kilowatt load to said x-ray tube reaching maximum permissible value as contained in said memory means such that further incrementing of said kV and mAs parameters will cause the programmed value of tube current to be decremented in a plurality of percentage steps representing altered values of constant tube current for the duration of the subsequent x-ray exposure, and means for displaying numerically the values of mA resulting from altering.

9. The apparatus as in claim 8 wherein operation of some of said technic selector switch means will effect selection of a unique set of mAs, mA and x-ray tube focal spot size parameters for use in conjunction with AEC and operation of other of said switch means will effect selection of a unique set of mAs, mA and x-ray tube focal spot for nonuse of AEC.

10. The apparatus as in claim 8 including body size related switch means operable in correspondence with respective sizes of the body intended for x-ray viewing, said kV and mAs values resulting from operation of one of said technic selector switch means being modified in correspondence with the body size switch means which is operated.

11. The apparatus as in claim 10 wherein the magnitudes of the respective modifiers for kV and mAs are programmed for each combination of switch settings.

12. The apparatus as in claim 8 wherein said altered value of mAs is divided by the programmed value or the altered value of mA, this quotient being used to determine the signal used to control said exposure time, and means to display said value of exposure time numerically.

13. A diagnostic x-ray system with an anatomically based programmed technic selector including an x-ray tube and power control means coupled with said tube, some of the parameters for x-ray technics controlled by said control means being the values of the current (mA), kilovoltage (kV), exposure time (S) and focal spot size of the tube and other parameters being the use and nonuse of automatic exposure control (AEC) and the x-ray field area sensor means to be used for a technic, central processor means having input and output means and including memory means for storing data corresponding with parameters for various x-ray technics and for storing programs to control said processor to select the parameters for the desired technic, a plurality of manually operable switch means having active and inactive states and including technic selector switch means related to anatomical areas, respectively composing the entire human body, said technic selector switch means being operable respectively to active states for effecting selection of a program which determines the preferential parameters for a frontal x-ray exposure of the corresponding anatomical area, means for coupling said switch means to said input means to enable said processor means to repeatedly determine the states of said switch means, said processor means responding to a technic selector switch means being in an active state by executing a program which results in providing output data to said output means corresponding with the parameters for the selected technic, and means responsive to said output data by controlling said x-ray tube power control means, and automatic exposure control means use of which is a preferential parameter for a majority of technics selectable with said anatomical area related technic selector switch means, said automatic exposure control means being preferentially activated by output data on said output means resulting from operation of one of a majority of said anatomical area related technic selector switch means for controlling said x-ray tube power control means to control the time of said exposure, some of said switch means being slewing switch means operable to select any of the x-ray tube kV, mA and mAs parameters, respectively, at the discretion of the user to override temporarily corresponding parameters determined by a program selected by operation of one of said anatomical area technic selector switch means, said processor means responding to any and all of said kV, mA and mAs slewing switches being operated to an active state by providing data on said output means corresponding with the selected value of mA, kV and mAs, and display means and means responsive to output data corresponding with the value of the kV, mA and mAs parameters as they are being selected and after selection is complete by controlling said means to display said values.

14. The apparatus as in claim 13 including:

a switch means designated as an exposure time selecting switch means, said automatic exposure control means being inactive in response to one of a minority of said anatomical area related technic selector switch means being operated, means for indicating when said automatic exposure control means is inactivated incidental to operation of one of said minority of technic selector switch means, said exposure time selecting switch means being operable to effect a fixed exposure time parameter for a technic wherein said automatic exposure control means is inactivated.

* * * * *